(12) United States Patent
Mizoguchi et al.

(10) Patent No.: US 7,384,327 B2
(45) Date of Patent: Jun. 10, 2008

(54) METHOD FOR GRINDING A BAR OF THIN FILM MAGNETIC ELEMENTS UTILIZING A PLURALITY OF RESISTIVE FILMS

(75) Inventors: Yoshiyuki Mizoguchi, Tokyo (JP); Kazuhide Yamada, Tokyo (JP); Tsuyoshi Umehara, Tokyo (JP); Nobuya Oyama, Tokyo (JP); Soji Koide, Tokyo (JP)

(73) Assignee: TDK Corporation, Tokyo (JP)

( * ) Notice: Subject to any disclaimer, the term of this patent is extended or adjusted under 35 U.S.C. 154(b) by 264 days.

(21) Appl. No.: 11/114,035

(22) Filed: Apr. 26, 2005

(65) Prior Publication Data
US 2005/0237673 A1    Oct. 27, 2005

(30) Foreign Application Priority Data
Apr. 27, 2004  (JP) .............................. 2004-131641

(51) Int. Cl.
*B24B 49/00* (2006.01)
*G11B 5/23* (2006.01)
*G01R 31/28* (2006.01)

(52) U.S. Cl. ...................... 451/8; 451/41; 360/125.33; 29/593; 29/603.16

(58) Field of Classification Search ................. 451/41, 451/8, 285–289; 360/119.1, 125.33, 125.38, 360/125.39; 29/593, 603.09, 603.16, 603.19
See application file for complete search history.

(56) References Cited

U.S. PATENT DOCUMENTS

| | | | | |
|---|---|---|---|---|
| 4,689,877 | A * | 9/1987 | Church ........................... | 451/1 |
| 4,914,868 | A * | 4/1990 | Church et al. .................. | 451/5 |
| 5,361,547 | A * | 11/1994 | Church et al. .................. | 451/5 |
| 6,193,584 | B1 * | 2/2001 | Rudy et al. ..................... | 451/5 |
| 6,364,743 | B1 * | 4/2002 | Pust et al. ...................... | 451/5 |
| 6,859,678 | B1 * | 2/2005 | Barada et al. .............. | 700/121 |

(Continued)

FOREIGN PATENT DOCUMENTS

JP          A-04-36008          12/1992

(Continued)

*Primary Examiner*—Maurina Rachuba
(74) *Attorney, Agent, or Firm*—Oliff & Berridge, PLC

(57) ABSTRACT

A method is presented for grinding a surface of an elongate bar having a plurality of thin film magnetic elements aligned in a line, each of the thin film magnetic elements having a magnetoresistive sensor for reading a magnetic record from a recording medium and an inductive electromagnetic transducer for writing a magnetic record into the recording medium in a stacked structure, the surface of the bar being a grind surface so that it can be formed into an air-bearing surface by means of the grinding. The method has steps of providing first resistive films on the grind surface in advance along a first longitudinal line parallel to a longitudinal direction of the bar, and providing second resistive films on the grind surface in advance along a second longitudinal line parallel to the longitudinal direction of the bar. The method further has a step of grinding the grind surface while pressing the bar against a rotating grinding disc with the longitudinal direction of the bar positioned toward a radial direction of the grinding disc, measuring electric resistance values of the first and second resistive films, and controlling an amount that is ground of the grind surface in the longitudinal direction and a direction perpendicular to the longitudinal direction based on the electric resistance values of the first resistive film and the second resistive films.

16 Claims, 13 Drawing Sheets

U.S. PATENT DOCUMENTS

| | | |
|---|---|---|
| 6,913,509 B2 * | 7/2005 | Sone et al. .................... 451/5 |
| 6,945,847 B2 * | 9/2005 | Ota et al. ...................... 451/7 |
| 2005/0047016 A1 * | 3/2005 | Koide et al. ............. 360/234.5 |
| 2006/0044683 A1 * | 3/2006 | Matono et al. ............. 360/126 |

FOREIGN PATENT DOCUMENTS

| | | |
|---|---|---|
| JP | A-05-205222 | 8/1993 |
| JP | 11-242806 A | 9/1999 |
| JP | A-2000-067408 | 3/2000 |
| JP | 2001-101634 A | 4/2001 |
| JP | A-2001-198806 | 7/2001 |

* cited by examiner (b)

METHOD FOR GRINDING A BAR OF THIN FILM MAGNETIC ELEMENTS UTILIZING A PLURALITY OF RESISTIVE FILMS

This application is a nonprovisional U.S. application, and claims the foreign priority and filing date benefit of Japanese Application No. 2004-131641, filed Apr. 27, 2004, the complete disclosure of which is incorporated herein by reference.

BACKGROUND OF THE INVENTION

1. Field of the Invention

The present invention relates to a method for grinding a bar in which thin film magnetic elements with inductive electromagnetic transducers and MR sensors are formed.

2. Description of the Related Art

A hard disk drive generally uses a thin film magnetic head. Among other kind of heads, a composite thin film magnetic head has been widely used, which has a stacked structure comprising a read head having a magnetoresistive sensor (also referred to as MR sensor) for reading magnetic data and a write head having an inductive electromagnetic transducer for writing magnetic data.

A thin film magnetic head of this kind is fabricated according to the following steps. First, a plurality of thin film elements each having an MR sensor and/or an inductive electromagnetic transducer in a stacked structure are formed on a ceramic substrate. Then the wafer on which the thin film elements are formed is cut into elongate bars such that a plurality of thin film elements are aligned in a single line. The cut bars are then ground by a special grinding machine to form an air-bearing surface.

FIGS. 1A to 1C exemplarily show a conventional method for grinding a bar in which thin film elements are formed in line. A wafer on which thin film magnetic elements are formed in two dimensions is cut line by line into bars 172. Bar 172 is carried on holder 156 as shown in FIG. 1A, and pressed against a rotating grinding disc 152 of a grinding machine while being carried on holder 156 as shown in FIG. 1B, whereby the entire grind surface of bar 172 is ground by grinding disc 152.

However, if bar 172 is pressed against grinding disc 152 in a tilted position, bar 172 is ground unevenly in the longitudinal direction of bar 172, i.e., in the direction in which the thin film magnetic elements are aligned. In other words, the inner circumferential portion is ground excessively while the outer circumferential portion is ground insufficiently as shown in FIG. 1C. In FIG. 1C, when bar 172 is ground to meet the line of "target MRH" shown in the figure, thin film magnetic element 161a disposed in radially outward portion will not be ground to the target MRH, thin film magnetic head 161b in the center portion will be ground to the target MRH, and thin film magnetic head 161c disposed in radially inward portion will be ground exceeding the target MRH.

For reference, the term "Air bearing surface (ABS)" is used herein to mean a surface of a thin film magnetic head facing a recording medium. The term "MR height (MRH)" is used to mean a height or length of an MR sensor measured perpendicularly from an ABS to the opposite end."

As an MR sensor, for example, an AMR (Anisotropic magneto Resistive) sensor utilizing an anisotropic magnetoresistive effect, a GMR (Giant Magneto Resistive) sensor utilizing a giant magnetoresistive effect, or a TMR (Tunnel Magneto Resistive) sensor utilizing a tunnel magnetoresistive effect are commonly used. It is important to form an MRH according to design requirement in order to ensure the output performance. For this reason, in the prior art, a wafer is formed with an extra amount of MR height. When the wafer is cut into bars, this surplus portion still remains. Then the bar is ground to ABS, and the surplus portion of the MR sensor is removed to form the target MRH.

Thus, if the amount that is ground varies depending on the position within the bar as described above, MRH varies from one thin film magnetic head to another, entailing significant degradation of the yield ratio. In order to address such an issue, a method has been disclosed in which resistive films, which are dummy films, are embedded in the grind surface of the bar in advance. Since the resistive films vary in electric resistance as the resistive films are ground, the amount that is ground can be controlled by monitoring the resistance value of the resistive films. For example, see specifications etc. of Japanese Patent Laid-down Publication No. 101634/2001 and 242802/99.

However, in the above prior art, while the amount that is ground are properly controlled in the longitudinal direction of the bar, the amount that is ground cannot be properly controlled in the direction perpendicular to the longitudinal direction of the bar, i.e., in the short direction of the bar, which will be explained below in detail.

A thin film magnetic head typically has an inductive electromagnetic transducer on the upper side of an MR sensor in the stacked direction. The inductive electromagnetic transducer has an upper magnetic pole layer and a lower magnetic pole layer, and pole tip regions of the both layers are opposite to ABS with a write gap sandwiched therebetween. For reference, the term "throat height (TH)" is used herein to mean the length (height) of a region in which both magnetic pole layers are opposite to each other with the write gap interposed, i.e., the length of pole tip regions from ABS to the opposite end. Since throat height TH is a key dimension for writing characteristics, it is desirable to form throat height TH accurately according to design requirement.

The drawing on the right in FIG. 1C schematically shows a distribution of the amount that is ground in the short direction of bar 172. MR sensor 161m and write head portion 161t are arranged side by side in the short direction. As has already been described, the amount that is ground of bar 172 in the longitudinal direction is controlled by using MRH as the target, so that thin film magnetic element 161b in the center portion shown in the figure is ground substantially to meet the target MRH. However, in reality, bar 172 is subject to a pitch motion in the circumferential direction in the grinding process due to various causes such as deformation of holder 156 and bar 172 themselves, the rigid adhesion of bar 172 to holder 156, and the variation in the position of bar 172 when attached to holder 156. This results in variation in the amount that is ground in the forward and backward direction of bar 172, i.e., in the rotational direction of grinding disc 152. While as shown in the drawing on the right in FIG. 1C, a larger amount of bar 172 may be ground in the forward portion as described above the arrow in the figure, the bar 172 may in other cases be ground in a larger amount in the backward portion as described below the arrow in the figure. The direction of the pitch motion is unsteady. In the actual grinding process, the amount that is ground may vary in both the longitudinal and perpendicular directions. However, the amount that is ground can be properly controlled in the longitudinal direction by the above conventional method.

As mentioned above, the amount that is ground was controlled by taking MRH as a reference in the prior art, because MRH is much smaller than throat height TH, and hence MRH is more likely to be subjected to greater influence by the variation in grinding. In fact, it was possible in the prior art to suppress the variation of throat height TH to a small extent by controlling MRH. It will be required, however, to improve accuracy in the dimension of throat height TH, as well as to suppress, as a matter of course, the variation of MRH, in the current tendency toward even higher areal density.

It has become difficult to improve the processing accuracy of throat height TH by conventional grinding methods, in which the processing accuracy of throat height TH depends on that of MRH, and there exists a need to control the processing accuracy of throat height TH itself.

SUMMARY OF THE INVENTION

It is an object of the present invention to provide a method for grinding a bar with thin film magnetic elements having an MR sensor and/or an inductive electromagnetic transducer, such that the amount that is ground is controlled not only in the longitudinal direction but also in the direction perpendicular to the longitudinal direction of the bar.

It is another object of the present invention to provide a wafer and a device suited to the above method for grinding a bar.

According to an embodiment of the present invention, a method is presented for grinding a surface of an elongate bar having a plurality of thin film magnetic elements aligned in a line, each of the thin film magnetic elements having a magnetoresistive sensor for reading a magnetic record from a recording medium and an inductive electromagnetic transducer for writing a magnetic record into the recording medium in a stacked structure, the surface of the bar being a grind surface so that it can be formed into an air-bearing surface by means of a grinding. The method has steps of providing first resistive films on the grind surface in advance along a first longitudinal line parallel to a longitudinal direction of the bar, and providing second resistive films on the grind surface in advance along a second longitudinal line parallel to the longitudinal direction of the bar. The method further has a step of grinding the grind surface while pressing the bar against a rotating grinding disc with the longitudinal direction of the bar positioned toward a radial direction of a grinding disc, measuring electric resistance values of the first and second resistive films, and controlling an amount that is ground of the grind surface in the longitudinal direction and a direction perpendicular to the longitudinal direction based on the electric resistance values of the first resistive film and the second resistive films.

In the method above described, first and second resistive films are arranged in the longitudinal direction and in the direction perpendicular to the longitudinal direction of the bar in two dimensions on the grind surface. Consequently, the amount that is ground of the bar can be monitored in the direction perpendicular to the longitudinal direction i.e., the direction in which the MR sensor and the inductive electromagnetic transducer are stacked, as well as in the longitudinal dimension. Furthermore, the amount that is ground can be controlled based on the results of the two-dimensional monitoring. In this way, the amount that is ground can be monitored and controlled in a positive manner, both in the longitudinal direction and in the direction perpendicular to the longitudinal direction of the bar, resulting in production accuracy of the MR sensor (MR height) and the inductive electromagnetic transducer (throat height). Consequently, variations in write characteristics as well as read characteristics will be suppressed, resulting in a satisfactory production yield even when higher areal density is required.

According to another embodiment of the present invention, a wafer having a plurality of thin film magnetic elements each having a magnetoresistive sensor for reading a magnetic record from a recording medium and an inductive electromagnetic transducer for writing a magnetic record to the recording medium in a stacked structure are provided. First resistive films and second resistive films are provided on a grind surface which emerges when the wafer is cut into a component in a predetermined shape. The first resistive films are provided along a first longitudinal line parallel to a longitudinal direction of the component and the second resistive films are provided along a second longitudinal line parallel to the longitudinal direction of the component, and electric resistance values of the first and second resistive films vary as the grind surface is ground.

According to yet another embodiment of the present invention, a device is provided for grinding a surface of an elongate bar having a plurality of thin film magnetic elements aligned in a line, each of the thin film magnetic elements having a magnetoresistive sensor for reading a magnetic record from a recording medium and an inductive electromagnetic transducer for writing a magnetic record into the recording medium in a stacked structure, the surface of the bar being a grind surface so that it can be formed into an air-bearing surface by means of the grinding. The device controls an amount that is ground of the bar in a longitudinal direction and in a direction perpendicular to the longitudinal direction of the bar based on amounts of grinding at a plurality of positions along a first longitudinal line parallel to the longitudinal direction of the bar and amounts of grinding at a plurality of positions along a second longitudinal line parallel to the longitudinal direction of the bar.

The above and other objects, features and advantages of the present invention will become apparent from the following description with reference to the accompanying drawings, which illustrate examples of the present invention.

DETAILED DESCRIPTION OF THE INVENTION

Figure 1A:
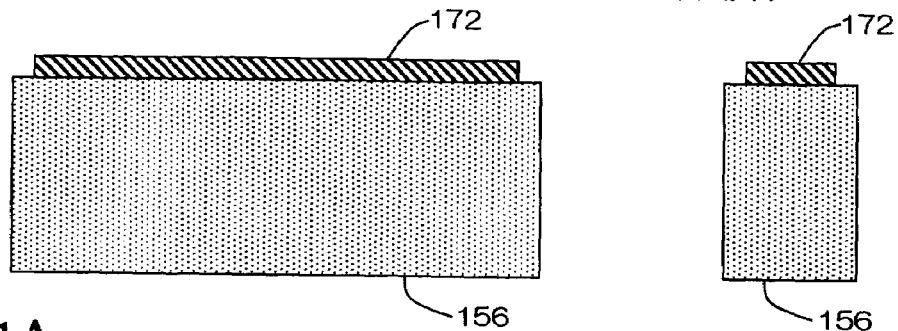
FIGS. 1A to 1C are explanatory diagrams to explain the problems in a conventional method for grinding a bar.
Figure 1B:
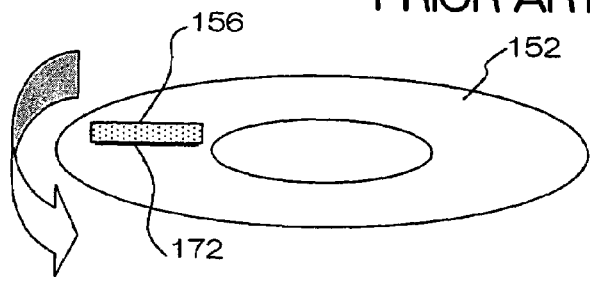
Figure 1C:
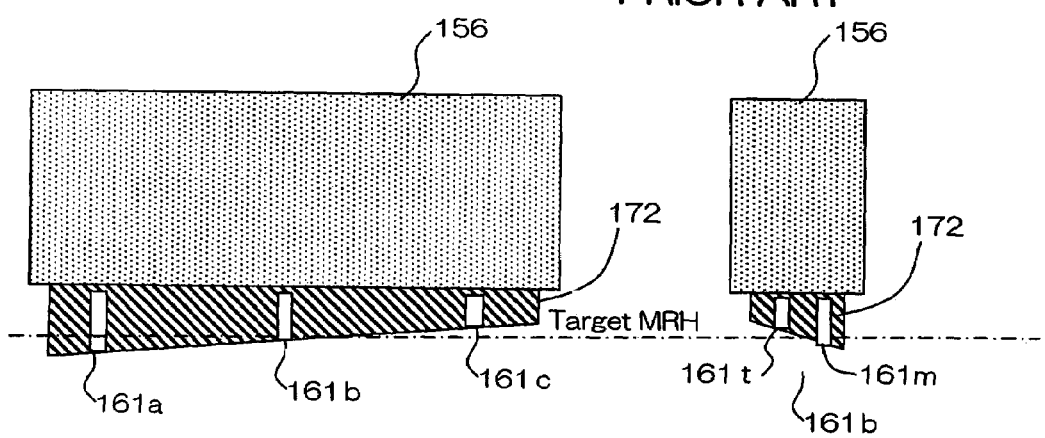
Figure 2:
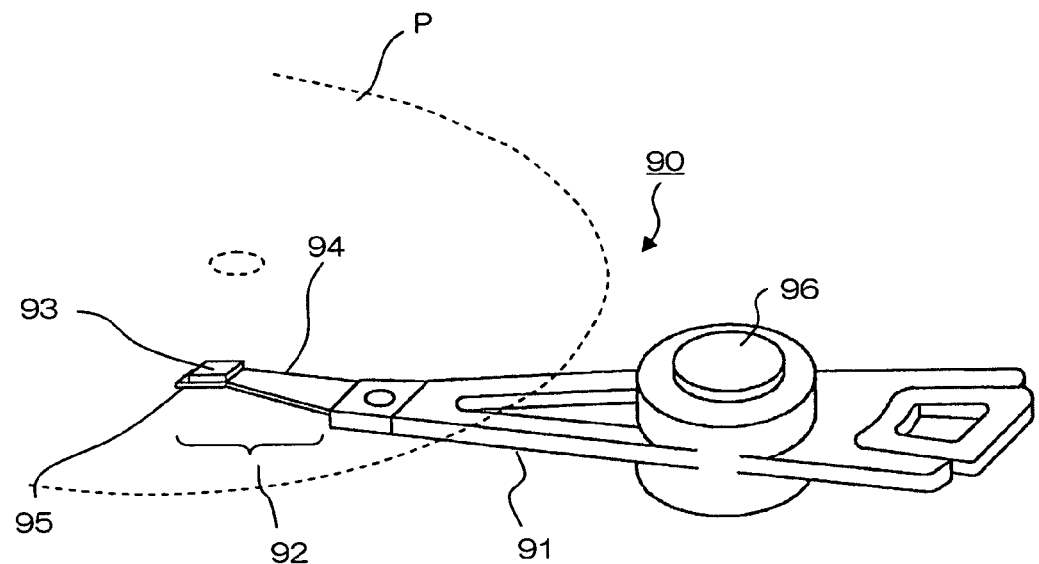
FIG. 2 is a schematic perspective view of a head arm assembly using a thin film magnetic head associated with the present invention.

Explanation is first presented with reference to FIG. 2 regarding a head arm assembly using a thin film magnetic head associated with the present invention. A plurality of head arm assemblies 90 are provided within a hard disc drive (not shown). The number of head arm assemblies 90 depends on the number of the discs of the drive. Head arm assembly 90 has arm 91 and head gimbal assembly 92 provided at one end of arm 91. The other end of arm 91 is carried by rotatable shaft 96. Head gimbal assembly 92 has slider 93 on which thin film magnetic head 81 (FIG. 3) is mounted, flexure 95 for supporting slider 93, and load beam 94 that connects flexure 95 to arm 91. Head arm assembly 90 rotates about shaft 96 and locates slider 93 at a prescribed position with respect to recording medium P. While slider 93 is positioned on the underside of recording medium P in FIG. 2, a similar head arm assembly is provided on the upperside of recording medium P.

Figure 3:
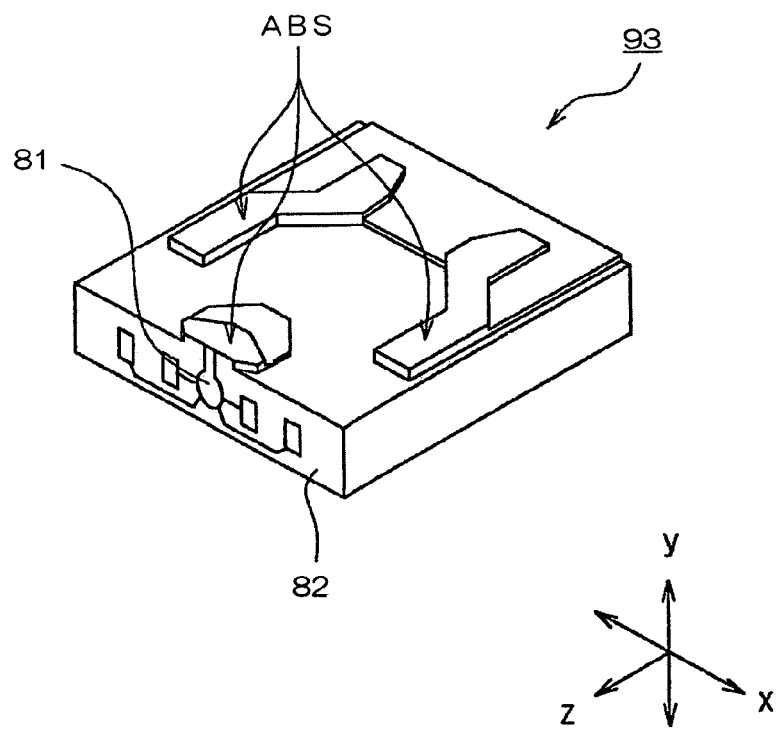
FIG. 3 is a schematic perspective view of a slider using the thin film magnetic head shown in FIG. 2 as viewed from the ABS side.

FIG. 3 is a perspective view of the slider as viewed from the ABS. Slider 93 is shown in a similar direction as in FIG. 2, and positioned opposite to the underside of recording medium P which can rotate. Slider 93 is provided with body 82 formed of substrate 1 through overcoat layer 20, as will be described later. Body 82 has a substantially hexahedral form. One surface of the six surfaces of body 82 defines the ABS. When recording medium P rotates, an airflow passes between recording medium P and slider 93 to create a dynamic lift, which is applied to slider 93 downward in the y direction of FIG. 3. Slider 93 is lifted away from the surface of recording medium P by this dynamic lift. For reference, the x direction in FIG. 3 is the transverse direction of the track of the recording medium P. Thin-film magnetic head 81 is formed in the proximity to the trailing edge of slider 93 on the outlet side of the airflow (the end portion at the lower left in FIG. 3).

Figure 4:
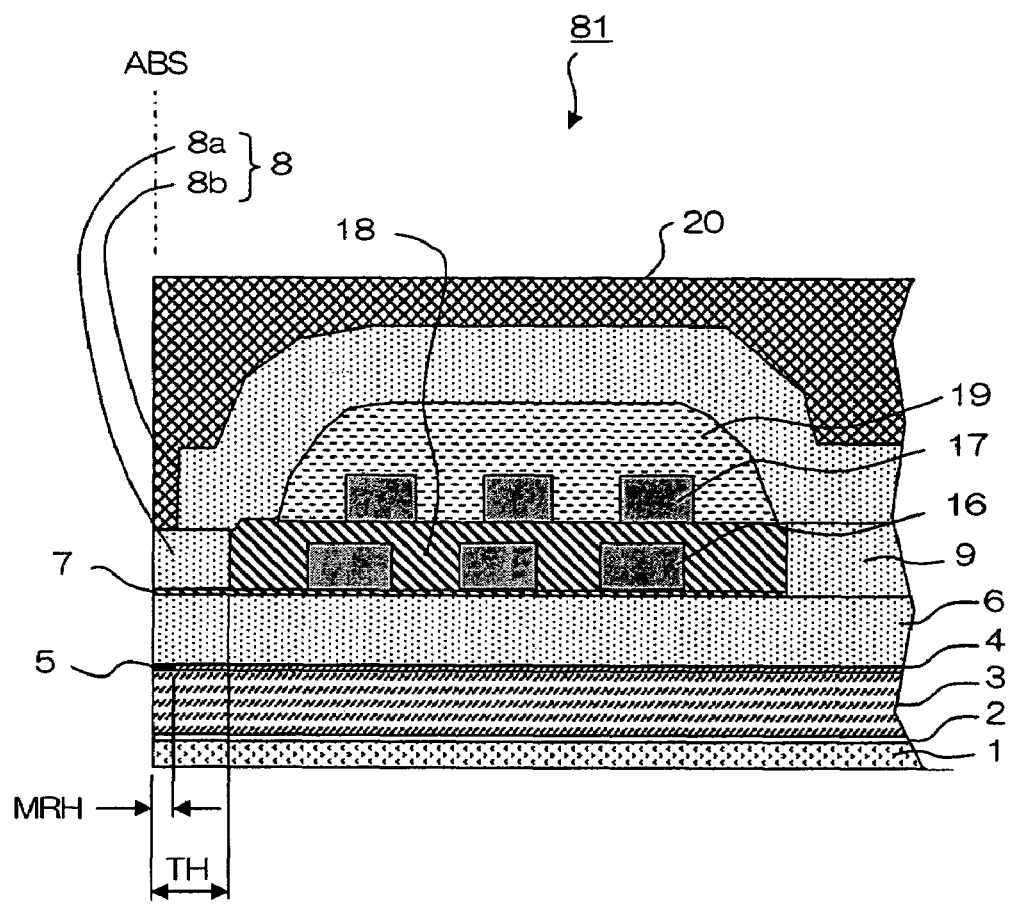
FIG. 4 is a schematic cross-sectional view of a thin film magnetic head associated with the present invention in the vicinity of the ABS.
Figure 5:
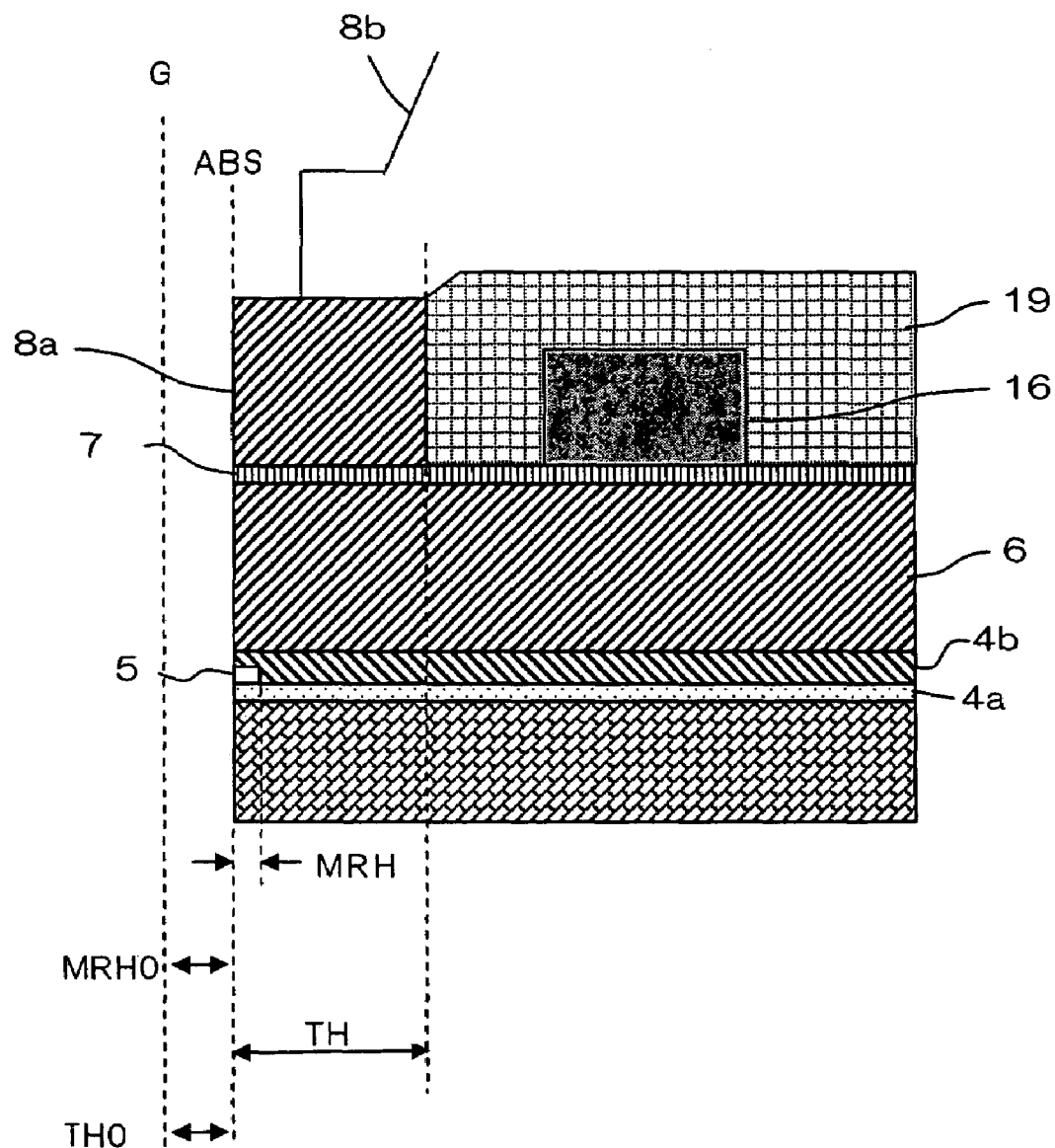
FIG. 5 is an enlarged partial cross-sectional view of the thin film magnetic head shown in FIG. 4.

FIG. 4 is a cross-sectional view of the main portion in the vicinity of ABS of a thin film magnetic head shown in FIG. 3. FIG. 5 is an enlarged partial cross-sectional view of the thin film magnetic head shown in FIG. 4 in the vicinity of the ABS. In FIGS. 4 and 5, recording medium P (not shown) extends close to the left side of ABS in a plane perpendicular to the plane of the drawing. Thin film magnetic head 81 has an MR sensor adapted to read magnetic records from magnetic medium P and an inductive electromagnetic transducer adapted to write magnetic records to magnetic medium P. The inductive electromagnetic transducer magnetizes magnetic domains of recording medium P either in the horizontal direction or the perpendicular direction with regard to the surface of recording medium P.

Thin film magnetic head 81 has substrate 1, dielectric layer 2, lower shield layer 3, shield gap layer 4 and lower magnetic pole layer 6 stacked in this order starting from substrate 1. On this stacked structure, upper magnetic pole layer 8, lower coil 16, and upper coil 17 are formed, and overcoat layer 20 covers the entire structure.

Substrate 1 is made of ceramic material, for example, AlTiC ($Al_2O_3$.TiC) or the like. Dielectric layer 2 formed over substrate 1 is made of dielectric material such as alumina ($Al_2O_3$) or the like. Lower shield layer 3 is made of, for example, perm-alloy (NiFe). Shield gap layer 4 is made of, for example, alumina.

Referring to FIG. 5, shield gap layer 4 is made of lower shield gap layer 4a and upper shield gap layer 4b in a stacked structure. MR sensor 5, which is a read element, is provided opposite to ABS between lower shield gap layer 4a and upper shield gap layer 4b, and shielded therebetween. MR sensor 5 is a magnetically susceptible film exhibiting a magnetoresistive effect, such as an AMR sensor, a GMR sensor, or a TMR sensor etc. A pair of lead layers (not shown) are connected to MR sensor 5 to supply sense current.

Referring to FIG. 4, lower magnetic pole layer 6 serves as a lower magnetic pole layer of the write head and as an upper shield layer of the read head (MR sensor 5). Lower magnetic pole layer 6 is made of magnetic material such as perm-alloy, CoNiFe or the like, which can be formed through the plating method etc.

Write gap 7 is provided between lower magnetic pole layer 6 and upper magnetic pole layer 8 to shield lower magnetic pole layer 6 and upper magnetic pole layer 8 from each other. One end of write gap 7 is opposite to ABS. Write gap 7 is made of non-magnetic metal material such as NiP or the like, that can be formed through the plating method.

Upper magnetic pole layer 8 has upper magnetic pole tip section 8a opposite to ABS, and upper magnetic pole yoke layer 8b formed apart from ABS and adapted to supply magnetic flux to upper magnetic pole tip section 8a. Upper magnetic pole layer 8 (upper magnetic pole yoke layer 8b) and lower magnetic pole layer 6 are connected through connection 9 to form a U-shaped magnet as a whole. Upper magnetic pole layer 8 is made of magnetic material such as perm-alloy, CoNiFe, etc., that can be formed through a plating method, preferably a high saturation magnetic flux density material.

Lower coil 16 and upper coil 17 are provided between upper magnetic pole layer 8 and lower magnetic pole layer 6, and between ABS and connection 9, stacked in two layers. Alternatively, the coil may be a single-layer structure or stacked in more than two layers. Lower coil 16 and upper coil 17 are shielded from upper magnetic pole layer 8 and lower magnetic pole layer 6 by dielectric layers 18, 19. Lower coil 16 and upper coil 17 are made of conductive material such as copper or the like. Lead layers (not shown) are connected to coil 16, 17 to receive current signals from an external circuit. The lead layers are also made of a conductive material, which may be the same as the material of upper magnetic pole yoke layer 8b.

Overcoat layer 20 is formed to cover upper magnetic pole layer 8 and the lead layers. Dielectric material, for example, alumina or the like is employed for the material of overcoat layer 20.

Referring to FIG. 5, throat height TH and MRH will be explained again. If throat height TH is too long, it prevents the magnetic pole layers from exerting a sufficient amount of leakage magnetic flux to ABS. If throat height TH is too short, it entails too small a contact area between upper magnetic pole tip section 8a and upper magnetic pole yoke layer 8b, and also leads to an insufficient amount of the leakage magnetic flux. For this reason, throat height TH is a very important dimension for the performance of the write head, and thus high production accuracy is highly required, as well as MRH as described above.

The above described layers are formed to align the line of grind surface G in advance, as shown in FIG. 5. Then, the grinding process which will be described below is done, and ABS is formed. If the layers are ground from grind surface G in the amount of MRH0 at the position of MR sensor 5, MRH will be obtained according to design requirement. If the layers are ground from grind surface G in the amount of TH0 at the position of write gap 7, throat height TH will be obtained according to design requirement. The amount of MRH0 and TH0 are, for example, approximately 0.7 µm.

Figure 6A:
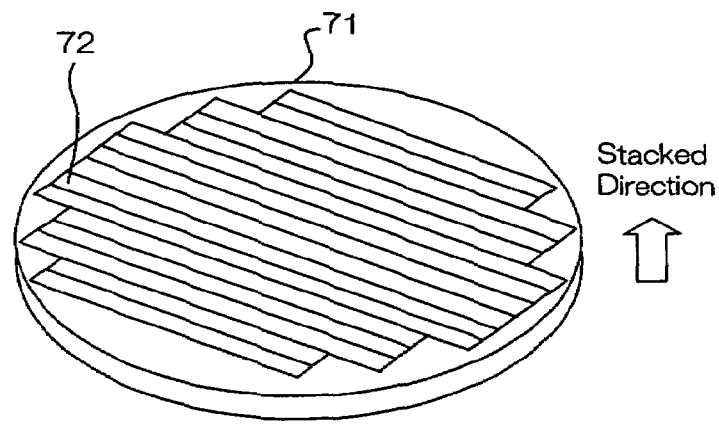
FIGS. 6A to 6C are schematic perspective views illustrating a wafer and a bar having thin film magnetic elements formed thereon.

Explanation is next presented regarding the method for grinding the thin film magnetic head according to the present invention, referring to FIGS. 6A to 12. FIG. 6A is a perspective views of a wafer on which a plurality of thin film magnetic elements are formed thereon.

Referring to FIG. 4 first, the method for fabricating a thin film magnetic element 61, which is one type of a conventional method, is explained briefly. Dielectric layer 2 is first formed on substrate 1 through, for example, the sputtering method. Next, lower shield layer 3 is formed on dielectric layer 2 through, for example, the sputtering method or the plating method. Shield gap layer 4 is next formed on lower shield layer 3 through, for example, the sputtering method. MR sensor 5 and a pair of lead layers (not shown) electrically connected to MR sensor 5 are formed in shield gap layer 4 through, for example, the sputtering method. Each of the layers that form MR sensor is patterned by means of conventional etching processes using a patterned resist layer, liftoff process, or both of the processes in combination. Lower magnetic pole layer 6 is next formed over shield gap layer 4 through, for example, the sputtering method or the plating method. Write gap 7 is next formed on lower magnetic pole layer 6 through, for example, the sputtering method, then upper magnetic pole tip section 8a and lower coil 16 are formed by means of the frame plating process. Lower coil 16 is covered with dielectric layers 18, on which upper coil 17 is formed in a similar manner. Upper magnetic pole yoke layer 8b, as well as connection 9, is then formed, by means of, for example, the frame coating process. Finally, overcoat layer 20 is formed to cover the overall stacked structure through, for example, the sputtering method. During the above steps, measuring elements 62 which will be described later are formed together.

Figure 6B:
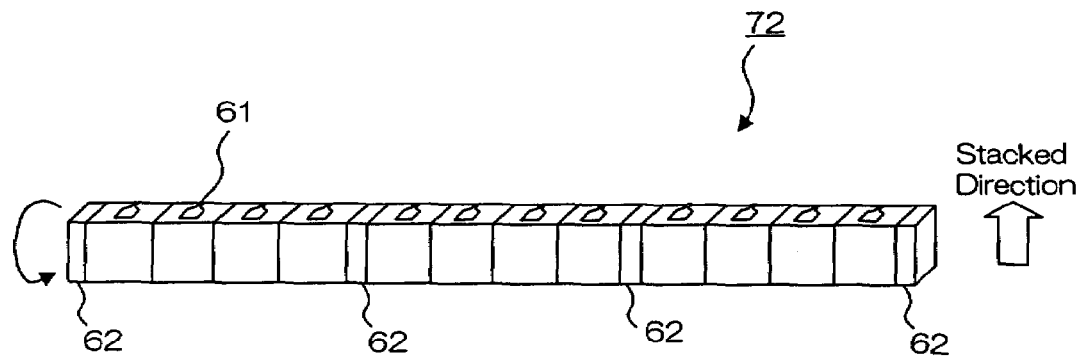

FIG. 6B is a perspective view of a bar which wafer 71 is cut into, as viewed from the stacked direction as FIG. 6A (represented in an outlined arrow). Bar 72 is an elongate bar having a plurality of thin film magnetic elements 61 formed in alignment, provided with measuring elements 62 that are arranged at both ends and intermediate positions for detecting amount that is ground. Measuring elements 62 are formed together with wafer 71 in advance, as described above.

Figure 6C:
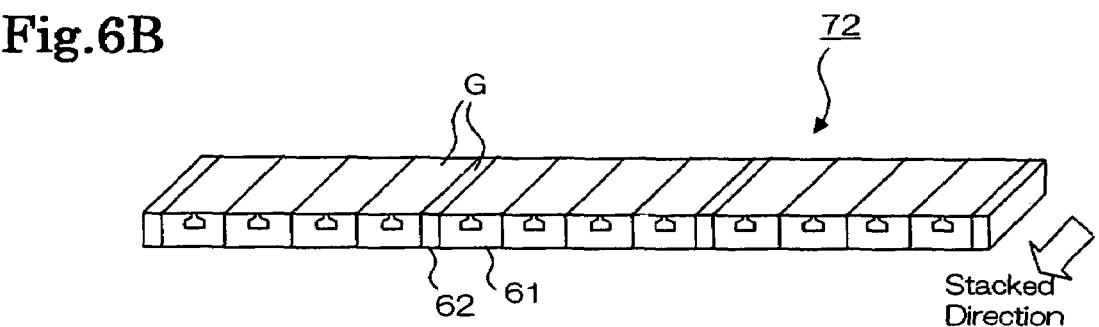

FIG. 6C is a perspective view of the bar as viewed in the direction in which grind surface G appears upwardly, i.e., the view after the bar has been rotated in the direction shown by the rotating arrow depicted in FIG. 6B. Grind surface G of bar 72 is a cut surface that emerges after wafer 71 is cut into elongate bars 72.

Figure 7:
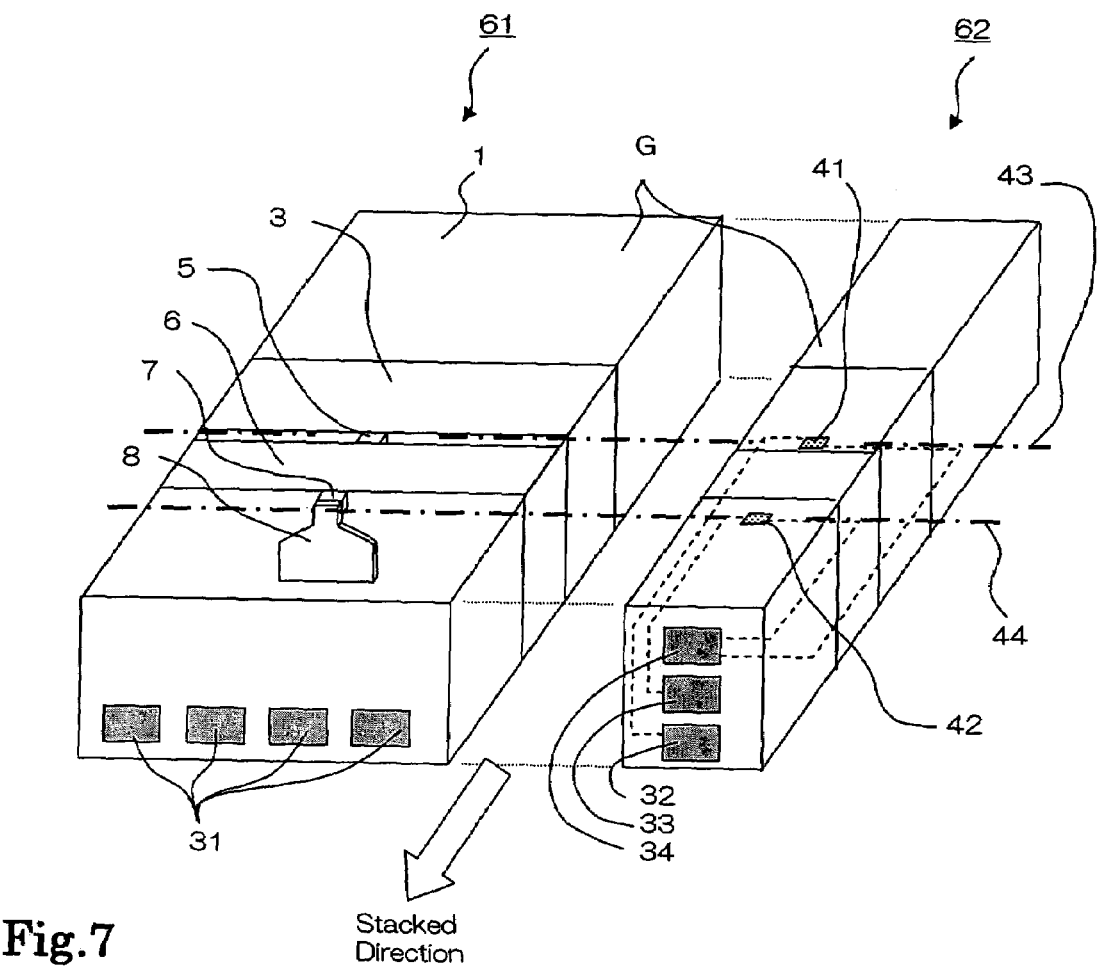
FIG. 7 is schematic perspective view of a thin film magnetic element and a measuring element associated with the present invention.

FIG. 7 is a detailed partial view of bar 72 as viewed in the same direction as FIG. 6C. FIG. 7 shows one thin film magnetic element 61 and one measuring element 62 out of the entire bar 72. Although thin film magnetic element 61 and measuring element 62 are represented as being separated from each other for illustrative purpose, they are formed together in a body in reality. MR sensor 5 and write gap 7, which will be ground later, are exposed on grind surface G of thin film magnetic element 61. Measuring element 62 is formed together with thin film magnetic element 61, and the layer configuration of measuring element 62 is basically identical with that of thin film magnetic element 61.

In measuring element 62, first resistive film 41 and second resistive film 42 are embedded instead of MR sensor 5 and write gap 7. First resistive film 41 may be of the same configuration as MR sensor 5, however, a variety of conductive metal films such as NiFe, Cu, NiCr, Au, NiCu, etc may also be used. The same applies to second resistive film 42. First resistive film 41 is arranged along first longitudinal line 43 parallel to the longitudinal direction of bar 72, and second resistive film 42 is arranged along second longitudinal line 44 parallel to the longitudinal direction of bar 72. First longitudinal line 43 is located at the same level as MR sensor 5 in the stacked structure. Second longitudinal line 44 may be located at the same level as write gap 7. Alternatively, second longitudinal line 44 may be located at a higher level than write gap 7 in the stacked direction, because such an arrangement in which MR sensor 5 and write gap 7 are interposed between first and second longitudinal lines 43, 44 enables higher accuracy in controlling grinding.

Three pads are provided on a surface of measuring element 62 other than grind surface G. In the present embodiment, first pad 32, second pad 33 and ground pad 34 are provided on the top surface in the stacked direction, i.e., the uppermost layer of wafer 71. First pad 32 is connected to first resistive film 41 through internal signal wiring (represented by the broken line in the figure), and first resistive film 41, in turn, is connected to ground pad 34 which is connected with the ground potential, through other internal signal wiring (represented by the broken line in the figure). Second pad 33 is connected to second resistive film 42 through third internal signal wiring (represented by the broken line in the figure) in a similar manner, and second resistive film 42, in turn, is connected to common ground pad 34, through fourth internal signal wiring (represented by the broken line in the figure).

Figure 8:
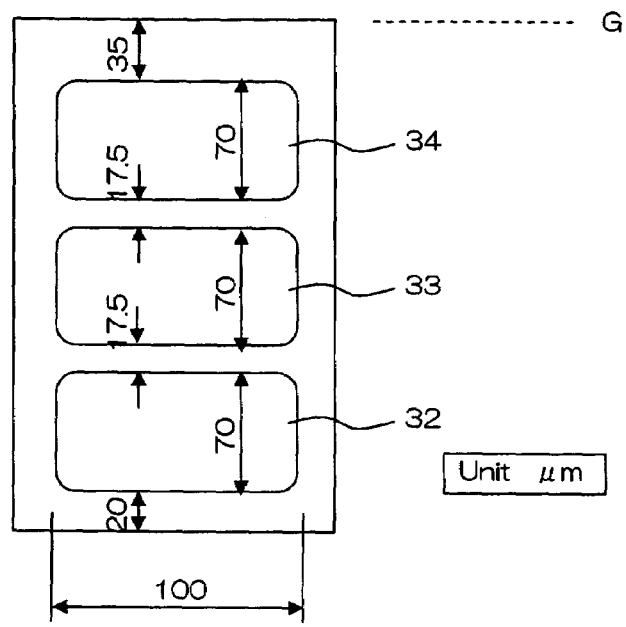
FIG. 8 is an explanatory diagram of pads of a measuring element.

FIG. 8 shows exemplary dimensions of the above pads and intervals between the pads. Although the pads are arranged close to the edge of grind surface G in FIGS. 7 and 8 in the order of ground pad 34, second pad 33 and first pad 32, they (pads 34, 33, 32) may be arranged in different orders. The dimensions of the pads and the intervals are not limited to the illustrated embodiment, as long as short-circuiting can be avoided between the pads.

As shown in FIG. 7, thin film magnetic element 61 is provided with four pads 31 on the same surface as pads 32, 33, 34. These pads are identical to prior art pads. Two out of the pads are connected with two signal lines for the write head portion, and the other two are connected with signal lines for MR sensor 5. These pads are also adapted to connect with external circuits.

Figure 9A:
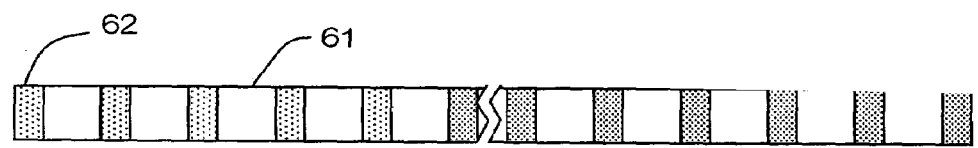
FIGS. 9A to 9C are explanatory diagrams illustrating arrangements of thin film magnetic elements and measuring elements in a bar.
Figure 9B:
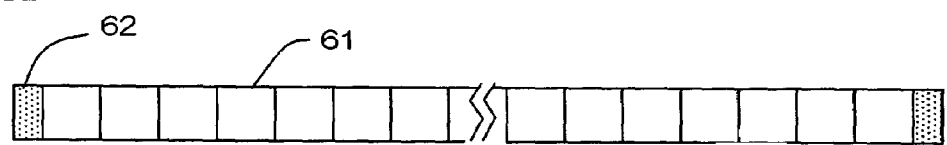
Figure 9C:
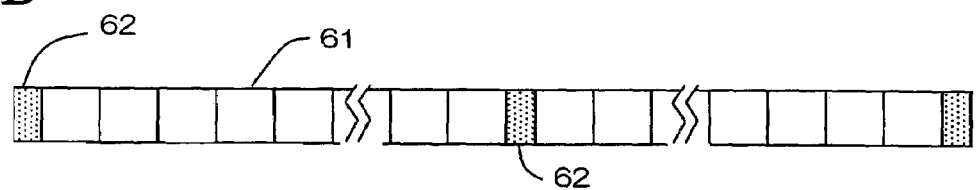

FIGS. 9A to 9C show exemplary arrangements of measuring elements 62. Intermediate portions of the bar are omitted in the figures, because a bar generally has fifty or more thin film magnetic elements 61. In FIG. 9A, measuring elements 62 are provided at the both ends of bar 72 and at each gap between adjacent thin film magnetic elements 61. In FIG. 9B, measuring elements 62 are provided only at both ends of bar 72. In FIG. 9C, three measuring elements 62 are provided at both ends and at an approximate middle position of bar 72. The arrangements of measuring elements, however, are not limited to the above examples. Measuring elements 62 may be provided at intervals of every four to six thin film magnetic elements in the intermediate portions of bar 72. Measuring elements 62 may also be provided at any positions close to the ends of bar 72. Alternatively, only first resistive films 41 may be provided in some of measuring elements 62 such that priority is given to control MRH, which is more important. Resistive films thus may be provided in various manners. However, it is preferable that at least two first resistive films 41 and two second resistive films 42 are provided, and when three or more films are provided, films 41 and 42 are arranged at the same intervals as far as possible in bar 72 respectively.

Figure 10:
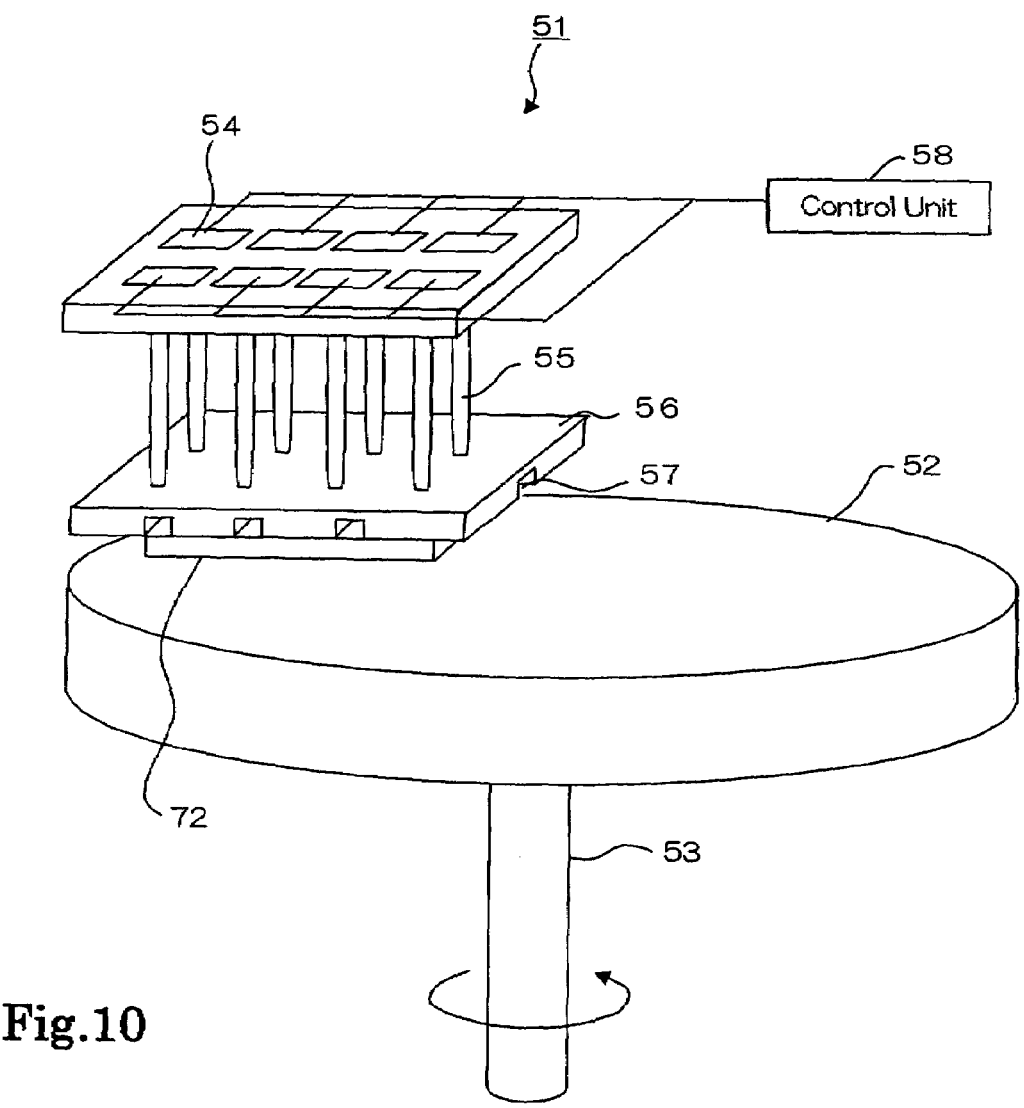
FIG. 10 is a schematic diagram illustrating the configuration of a grinding machine according to the present invention.

FIG. 10 shows a schematic configuration of a grinding machine used for a thin film magnetic head. Grinding machine 51 has rotatory grinding disc 52 for grinding bar 72, loading devices 54 for providing press force with which bar 72 is pressed against grinding disc 52, and a plurality of load transmitting members 55. Each load transmitting members 55 is arranged between associated loading device 54 and holder 56 for holding bar 72 when grinding machine 51 is in operation, receives the press force generated by loading device 54, and presses bar 72 against grinding disc 52 through holder 56. Load transmitting elements 55 are arranged on the side opposite to the grind surface, along two longitudinal lines parallel to the longitudinal direction of bar 72. Bar 72 is pressed against grinding disc 52, with the longitudinal direction of bar 72 positioned toward the radial direction of grinding disc 52.

Grinding disc 52 is a circular disc formed of, for example, Sn (tin) with diamond abrasive embedded in the surface thereof. Grinding disc 52 is connected to rotatory shaft 53 and rotated by a driving mechanism (not shown).

Loading devices 54 may be, for example, an electromagnetic or hydraulic actuator. Each loading device 54 and load transmitting member 55 are preferably arranged at the position corresponding to each of first and second resistive films 41, 42 of measuring element 62. However, the arrangement of loading devices 54 and load transmitting members 55 are not limited to the above. For example, the number of loading devices 54 and load transmitting members 55 may be smaller than the number of first and second resistive films 41, 42.

The surface of holder 56 on which bar 72 is mounted is partitioned by grooves 57 into sections each corresponding to a contact point between associated load transmitting member 55 and holder 56. For example, in the embodiment shown in FIG. 10, the surface of holder 56 is partitioned into 2×4 sections. This arrangement allows each transmitting element 55 to exert press force only around transmitting element 55.

Loading device 54 is connected to control unit 58, which performs feedback control based on the resistance values of first and second resistive films 41, 42 so that MRH and throat height TH will obtained according to design requirement.

Grinding machine 51 may be of the same configuration as a prior art grinding machine except that loading devices 54 and load transmitting members 55 are provided in more than one raw. The details are described in the specifications etc. of Japanese Patent Laid-open Publication No. 101634/2001, 863/99, and 10-7231/98. For example, grinding machine 51 may be configured to rotate in a direction perpendicular to grind surface G of bar 72 in order to avoid defects called smears that extend in a certain direction on bar 72.

Figure 11:
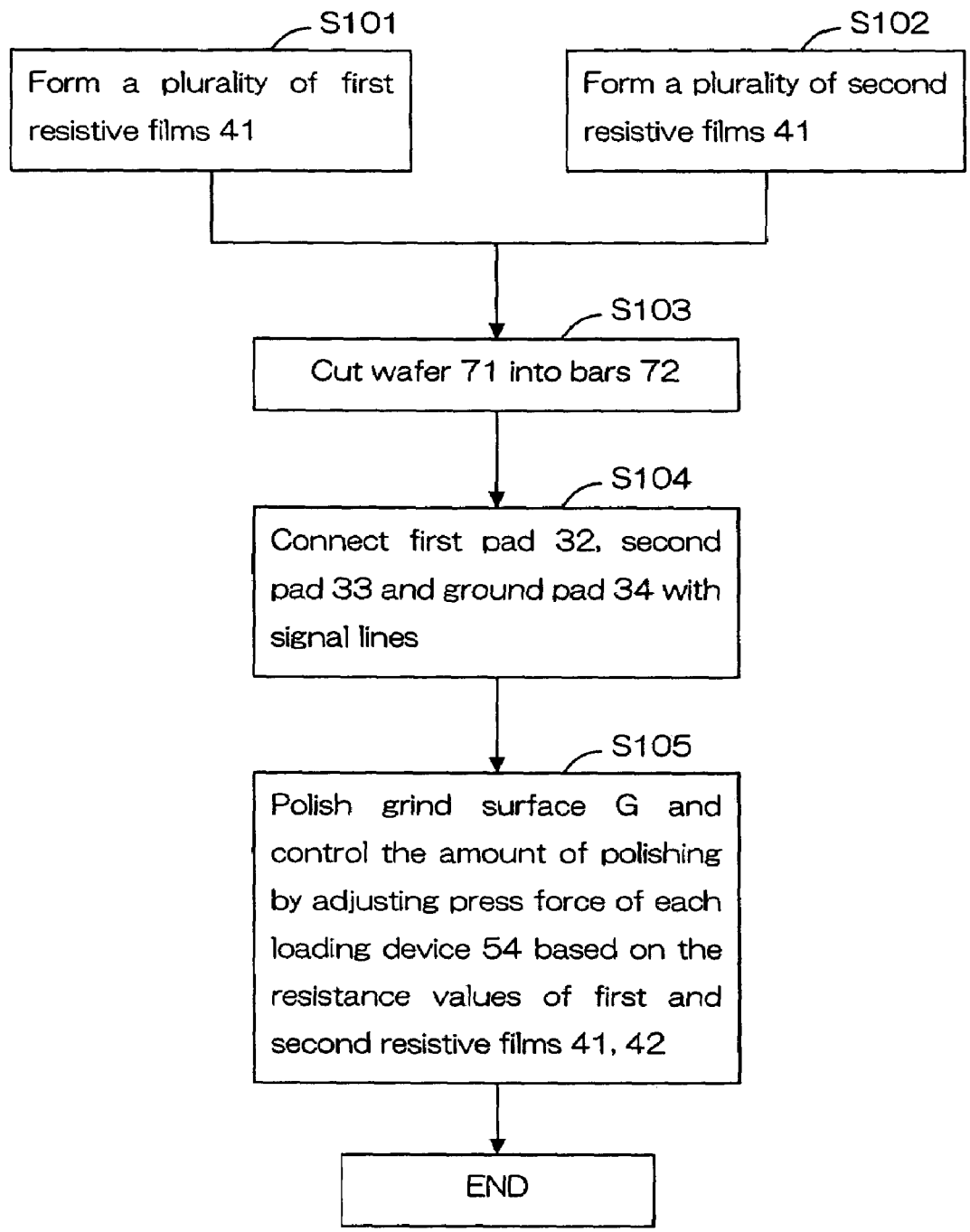
FIG. 11 is a schematic flow chart of the method for grinding a bar according to the present invention.

Explanation is next presented regarding the sequences of the method for grinding a bar according to the present invention with reference to FIG. 11. First, the above-described layers from dielectric layer 2 to overcoat layer 20 are disposed on substrate 1. During this sequence, a plurality of first resistive films 41 are formed in advance on grind surface G (which has not emerged yet) of bar 72 along first longitudinal line 43 parallel to the longitudinal direction of bar 72 (Step 101.) A plurality of second resistive films 42 are also formed in advance on grind surface G of bar 72 along second longitudinal line 44 parallel to the longitudinal direction of bar 72 (Step 102.) First resistive films 41 may be formed together with MR sensor 5. Second resistive films 42 may be formed when write gap 7 or dielectric layer 18 is disposed.

Next, wafer 71 is cut into elongate bars 72 by means of a machining tool, for example, a dicing saw etc. such that a plurality of thin film magnetic elements 61 and measuring elements 62 are aligned in a line (step 103.)

Bar 72 is then secured on holder 56 and set on grinding machine 51. First pad 32, second pad 33 and ground pad 34 of each measuring element 62 are connected with signal lines which are to be connected with control unit 58 (Step 104.)

Next, grind surface G is ground, while being pressed against rotating grinding disc 52 with the longitudinal direction of bar 72 positioned toward the radial direction of grinding disc 52. Control unit 58 receives the resistance values of first and second resistive films 41, 42 through the above described signal lines, and adjusts the press force of each loading device 54 based on respective resistance values of first resistive films 41 and second resistive films 42 to control the amount that is ground of grind surface G with respect to the longitudinal direction and the direction perpendicular the longitudinal direction (Step 105).

Figure 12:
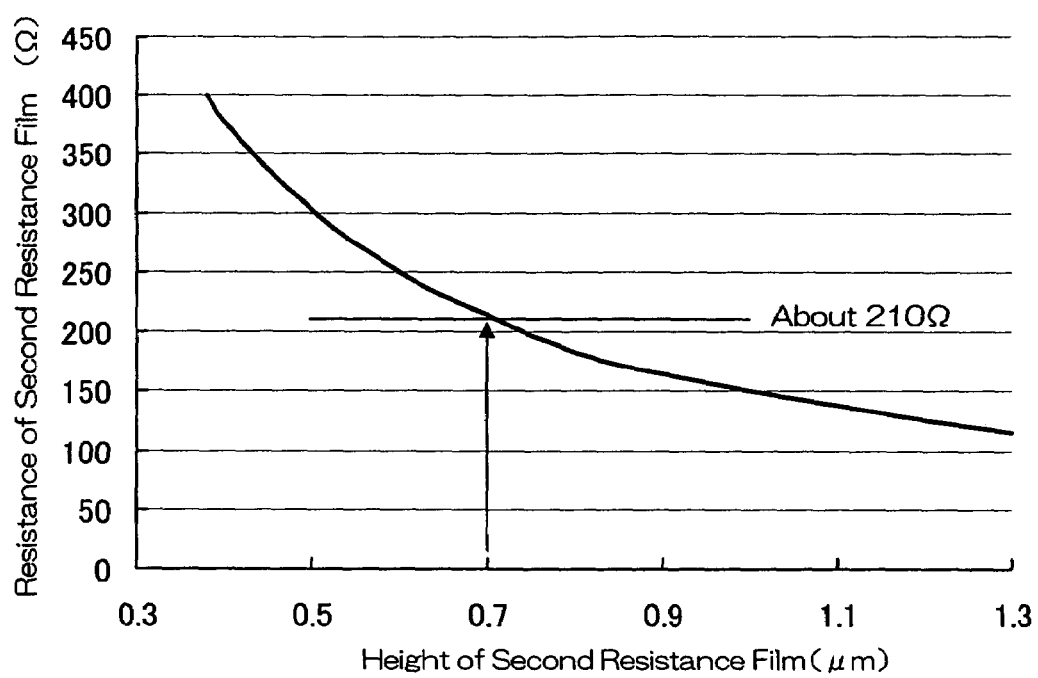
FIG. 12 is an explanatory diagram illustrating the correlation between a resistance value of a resistive film and an amount that is ground.

FIG. 12 shows an example of the correlation between the height (amount that is ground) of a resistive film and the electric resistance value used in this step. The abscissa represents the height of resistive film 42, i.e., the remaining height of the resistive film after being ground, measured in the direction perpendicular to ABS. The ordinate represents an electric resistance value corresponding to the resistive film height of second resistive film 42. The resistance value generally tends to increase as the resistive film is ground which causes a decrease in the height of resistive film. In other words, as the grinding progresses, the resistance value goes from right to left in the figure. Thus, the desired amount that is ground can be easily detected by preparing in advance the correlation (a second correlation) shown in FIG. 12, and determining whether a prescribed resistance value is obtained by referring to the correlation. FIG. 12 shows, as an example, that the target height of second resistive film 42 is 0.7 μm and when the resistance value reaches 210 Ω, the target height is obtained.

The height of first resistive film 41 can be controlled in the same manner as the height of second resistive film 42 shown in FIG. 12, by preparing in advance a similar correlation (a first correlation). Further, if first resistive film 41 and second resistive film 42 are of the same composition and of the same dimensions, the first and second correlations will be identical. In this case, only one correlation needs to be prepared in advance and referred to in the control.

Figure 13A:
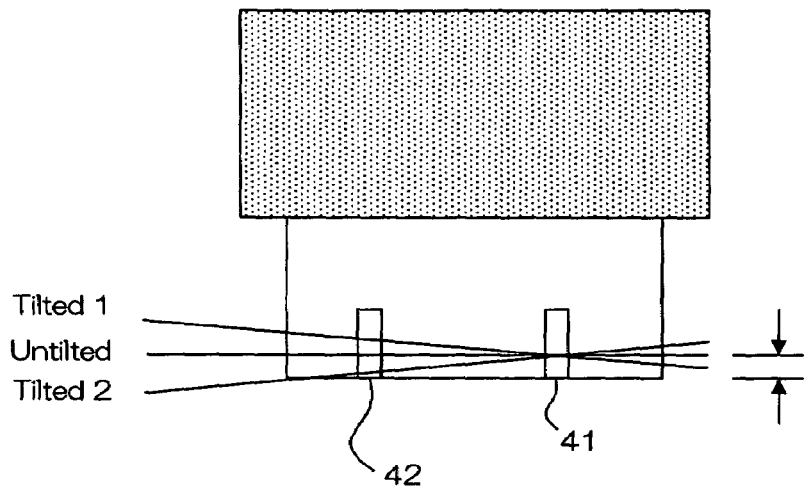
FIGS. 13A and 13B are explanatory diagrams illustrating effects of the present invention.
Figure 13B:
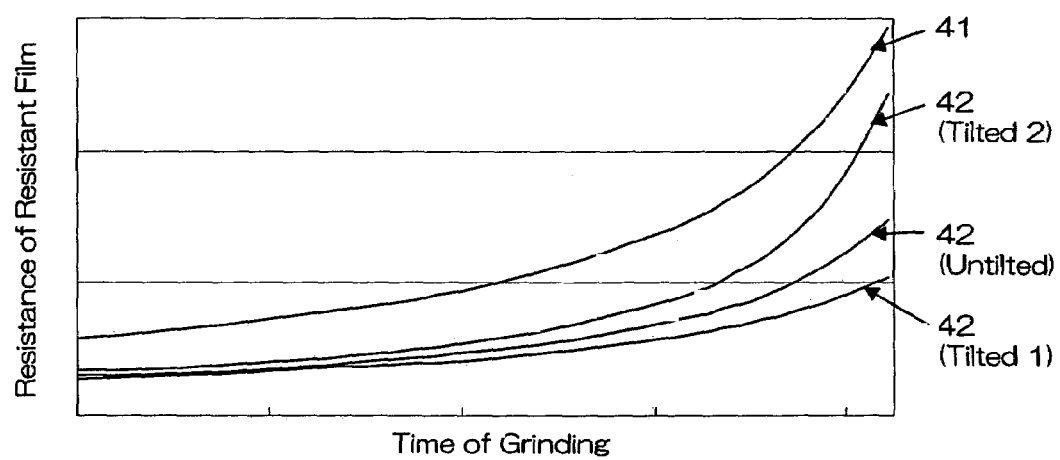

In this way, the amount that is ground can be monitored and controlled not only in the longitudinal direction but also in the direction perpendicular to the longitudinal direction of bar 72, and each of the MR sensors (MRH) and inductive electromagnetic transducers (throat height TH) can be formed according to design requirement. FIGS. 13A and 13B schematically show the effect of an embodiment of the present invention. For example, if bar 72 is secured to holder 56 in a tilted position, then bar 72 is not ground along the "flat" line, but along "tilt 1" line or "tilt 2" line in FIG. 13A. In other words, if the amount that is ground is monitored only by first resistive film 41, then bar 72 is ground correctly at the position of first resistive film 41, however, it is not possible to detect whether bar 72 is ground in a prescribed amount at positions other than first resistive film 41, for example, when bar 72 is ground along "tilt 1" line or "tilt 2" line. In the present invention, on the contrary, the resistance value of second resistive film 42, provided in the vicinity of a write head portion, diverges as shown in FIG. 13B if bar 72 is ground along a tilted line, resulting in an easy detection that bar 72 is ground along a tilted line.

Figure 14A:
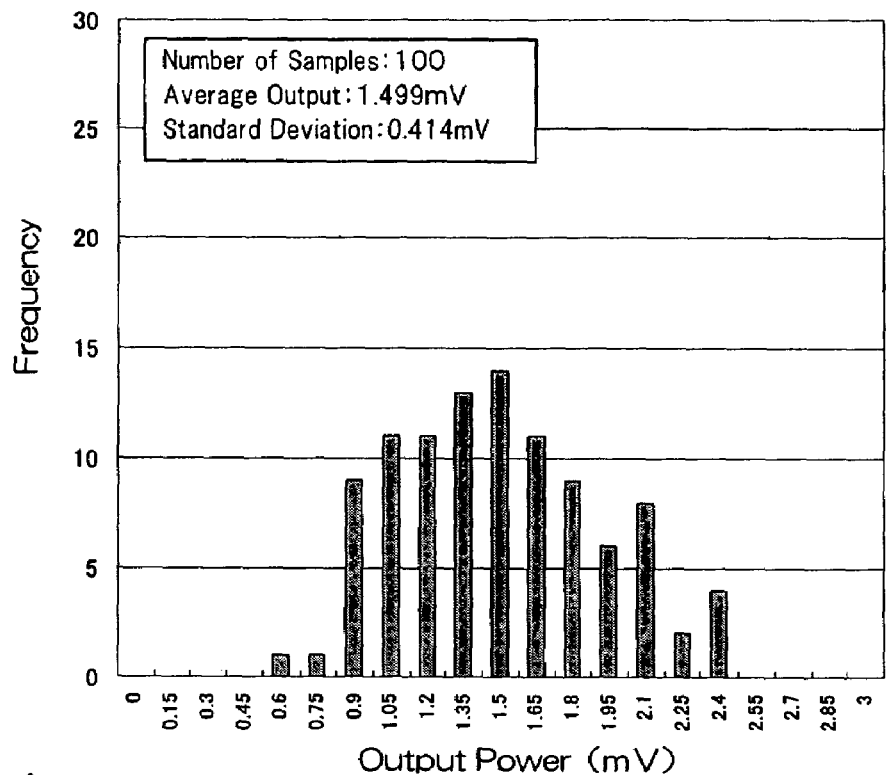
FIGS. 14A and 14B are explanatory diagrams illustrating effects of the present invention.
Figure 14B:
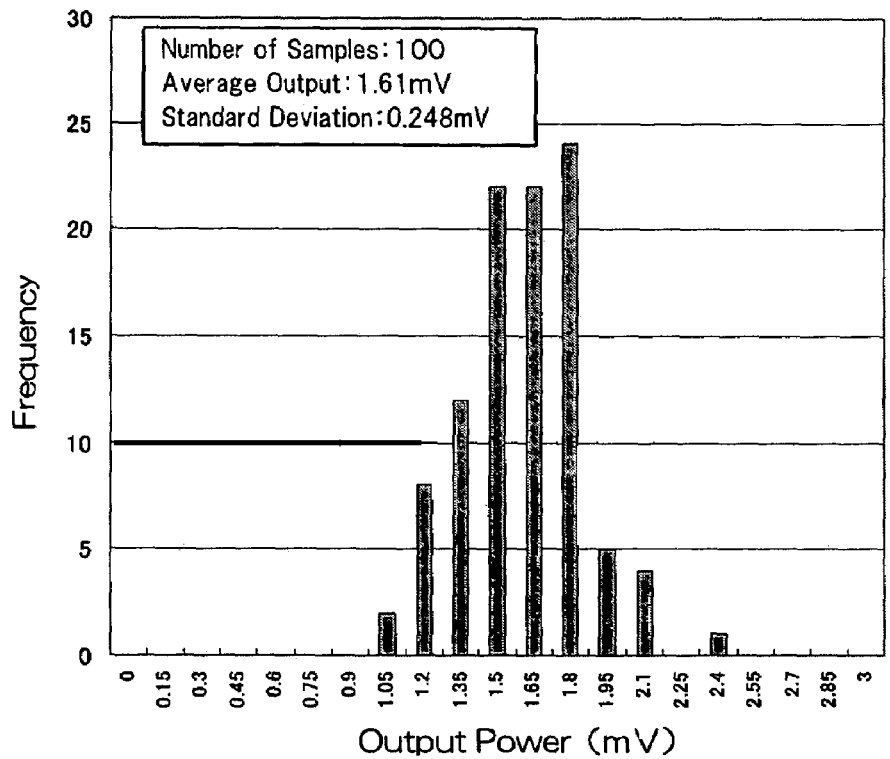

Next, the variation of the characteristics of actual thin film magnetic heads was examined based on samples in order to evaluate the effect of the present invention quantitatively. The samples were thin film magnetic heads having cross-sectional configurations shown in FIG. 4. The samples according to the present invention were provided with the first and second resistive films, and the samples according to prior art were provided only with the first resistive films. One hundred samples were made according to the present invention and prior art, respectively. Detailed test conditions were as described below Diameter of wafer: about 9 cm $\phi$(3.5 inch $\phi$)
Revolution number of wafer in grinding: 7200 rpm
Measurement position: intermediate circumferential position (about 3 cm (1.2 inch) from the center)
Write current: 30 mA, frequency 270 MHz
Read current: 3.0 mA
Effective write width of head: 0.25 μm
Effective read width of head: 0.17 μm FIGS. 14A and 14B show the result of measurements of the output power in histograms, FIG. 14A representing the test results of the samples according to prior art and FIG. 14B representing the test results of the samples according to the embodiment, respectively. The variation of the outputs (the standard deviation) decreased from 0.414 mV to 0.248 mV and an average output increased from 1.499 mV to 1.61 mV. Thus, it was confirmed that both the absolute value of and variation in the output were improved.

Figure 15A:
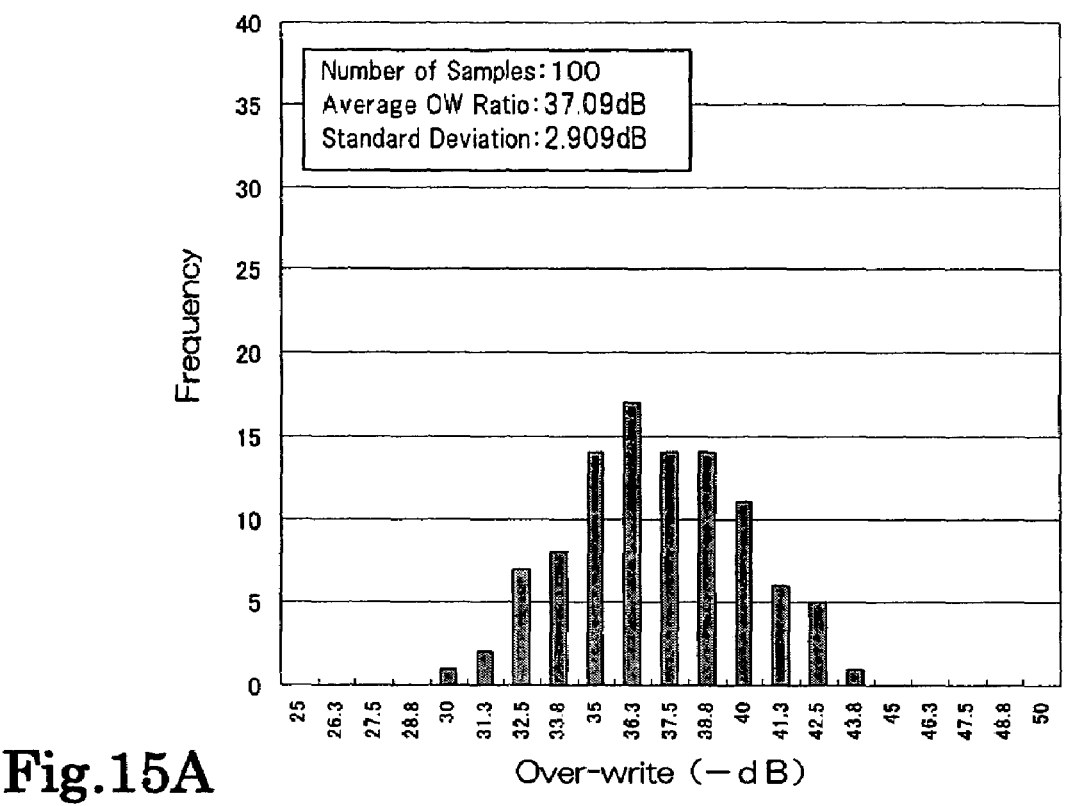
FIGS. 15A and 15B are explanatory diagrams illustrating effects of the present invention.
Figure 15B:
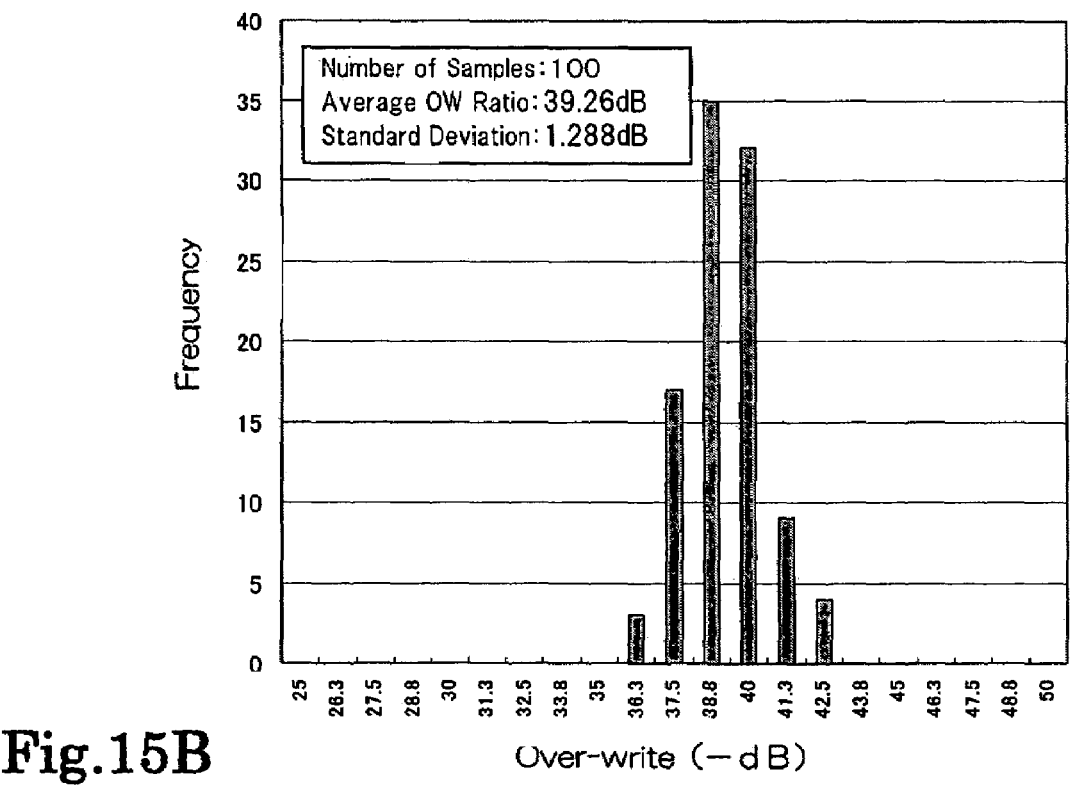

FIGS. 15A and 15B show the result of measurements of overwrite characteristics in histograms, FIG. 15A representing the test results of the samples according to prior art, and FIG. 15B representing the test results of the samples according to the embodiment, respectively. The overwrite characteristic is defined by a ratio VLF'/VLF, more precisely defined as OW ratio=$-20 \text{ Log}_{10}$ (VLF'/VLF), in unit of dB. VLF represents the peak output of a predetermined low frequency signal pattern which was written into a recording medium. VLF' represents the peak output of the residual component of the low frequency signal pattern in the recording medium after a predetermined high frequency signal pattern having a peak output VHF was written (overwritten) into the recording medium. Thus, the larger OW ratio corresponds to better write performance (overwrite performance). The variation of the OW ratio (the standard deviation) decreased from 2.909 dB to 1.288 dB and an average OW ratio increased from 37.09 dB to 39.26 dB. Thus, it was confirmed that both the absolute value of and variation in the OW ratio were improved.

From the foregoing description, the method for grinding a bar according to the present invention enables improving the processing accuracy of throat height, as well as MR height. Hence, the present invention can provide a thin film magnetic head in which the variations in write characteristics as well as read characteristics will be suppressed, resulting in a satisfactory production yield even when higher areal density is required.

Although a certain preferred embodiment of the present invention has been shown and described in detail, it should be understood that various changes and modifications may be made without departing from the spirit or scope of the appended claims.

What is claimed is:

1. A method for grinding a surface of an elongate bar having a plurality of thin film magnetic elements aligned in a line, each of the thin film magnetic elements having a magnetoresistive sensor for reading a magnetic record from a recording medium and an inductive electromagnetic transducer for writing a magnetic record into the recording medium in a stacked structure, the surface of the bar being a grind surface so that it can be formed into an air-bearing surface by means of a grinding, comprising the steps of:
   providing first resistive films on the grind surface in advance along a first longitudinal line parallel to a longitudinal direction of the bar;
   providing second resistive films on the grind surface in advance along a second longitudinal line parallel to the longitudinal direction of the bar, the second longitudinal line being non-co-linear with the first longitudinal line; and
   grinding the grind surface while
   pressing the bar against a rotating grinding disc with the longitudinal direction of the bar positioned toward a radial direction of the grinding disc,
   measuring electric resistance values of the first and second resistive films, and
   controlling an amount that is ground of the grind surface in the longitudinal direction and a direction perpendicular to the longitudinal direction based on the electric resistance values of the first resistive films and the second resistive films.

2. The method according to claim 1, wherein the steps of providing the first resistive films and the second resistive films include arranging measuring elements each provided with the first resistive films and the second resistive films between adjacent thin film magnetic elements, and/or at one end or both ends in the longitudinal direction of the bar.

3. The method according to claim 2, wherein the measuring elements are arranged substantially at the same intervals in the longitudinal direction.

4. The method according to claim 1, wherein the thin film magnetic element has the magnetoresistive sensor and/or a write gap of the inductive electromagnetic transducer stacked in this order, and either of the first and second longitudinal lines is located on an upper side of the write gap in a stacked direction.

5. The method according to claim 1, further including a step of providing pads in advance for measuring the electric resistance values of the first and second resistive films, on a surface other than the grind surface, wherein the step of grinding the grind surface includes measuring the electric resistance values of the first and second resistive films through the pads.

6. The method according to claim 5, wherein the pads include a first pad for measuring the electric resistance value of the first resistive films, a second pad for measuring the electric resistance value of the second resistive films and a third pad for providing a ground potential common to the first and second pads.

7. The method according to claim 1, further including a step of calculating a first correlation between the electric resistance value and an amount that is ground of the first resistive film and a second correlation between the electric resistance value and an amount that is ground of the second resistive film, wherein
the step of grinding the grind surface includes controlling the amount that is ground based on the first and second correlations.

8. The method according to claim 7, wherein the first correlation and the second correlation are identical.

9. A wafer comprising:
a plurality of thin film magnetic elements each having a magnetoresistive sensor for reading a magnetic record from a recording medium and an inductive electromagnetic transducer for writing a magnetic record to the recording medium in a stacked structure; and
first resistive films and second resistive films which are provided on a grind surface which emerges after the wafer is cut into a component in a predetermined shape;
wherein the first resistive films are provided along a first longitudinal line parallel to a longitudinal direction of the component and the second resistive films are provided along a second longitudinal line parallel to the longitudinal direction of the component, the second longitudinal line being non-co-linear with the first longitudinal line, and electric resistance values of the first and second resistive films vary as the grind surface is ground.

10. The wafer according to claim 9, wherein the component is an elongate bar having the thin film magnetic elements aligned in a single line, each of the thin film magnetic elements having a surface facing in a direction perpendicular to the longitudinal direction of the bar, the surface being the grind surface so that it can be formed into an air-bearing surface by means of the grinding.

11. The wafer according to claim 10, wherein the first resistive films and the second resistive films are provided in measuring elements and the measuring elements are arranged between adjacent thin film magnetic elements, and/or at one end or both ends in the longitudinal direction of the bar.

12. The wafer according to claim 11, wherein the measuring elements are arranged substantially at the same intervals in the longitudinal direction.

13. The wafer according to claim 9, wherein the thin film magnetic element has the magnetoresistive sensor and/or a write gap of the inductive electromagnetic transducer stacked in this order, and either of the first and second longitudinal lines is located on an upper side of the write gap in a stacked direction.

14. The wafer according to claim 9, further comprising pads for measuring electric resistance values of the first and second resistive films on a surface other than the grind surface.

15. The wafer according to claim 14, wherein the pads include a first pad for measuring the electric resistance value of the first resistive films, a second pad for measuring the electric resistance value of the second resistive films and a third pad for providing a ground potential common to the first and second pads.

16. The wafer according to claim 9, wherein the first resistive films and the second resistive films are identical.

* * * * *